Jan. 3, 1967
N. SWANSON ETAL
3,295,930
APPARATUS AND METHOD FOR TREATING PARTICULATE MATERIAL
Filed July 5, 1963
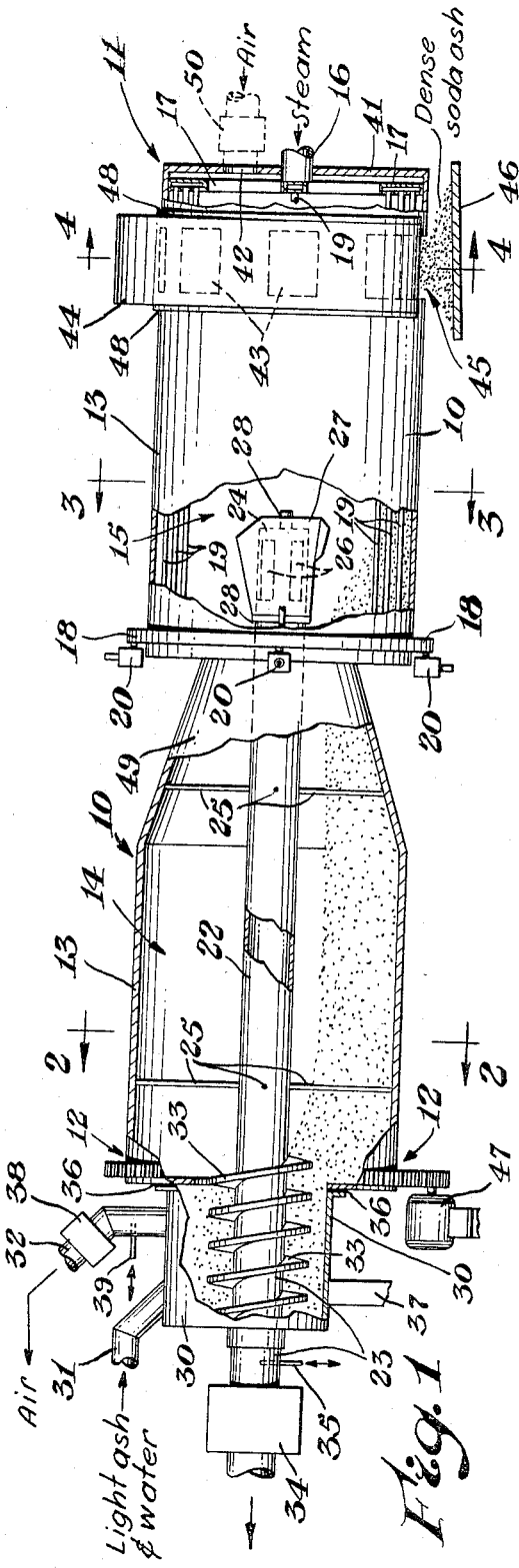
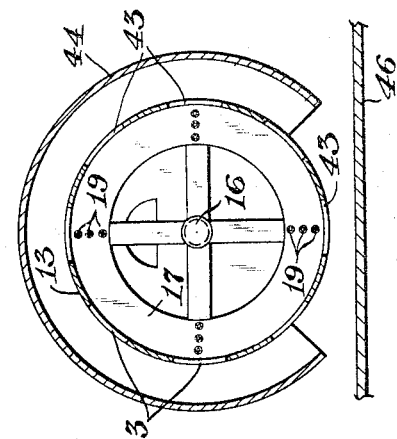
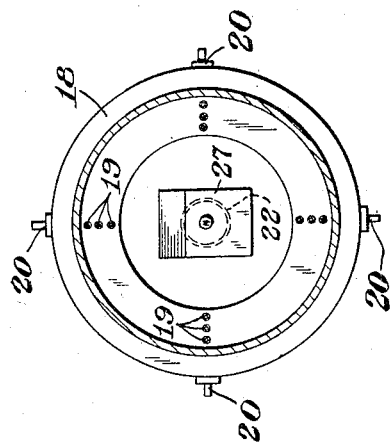
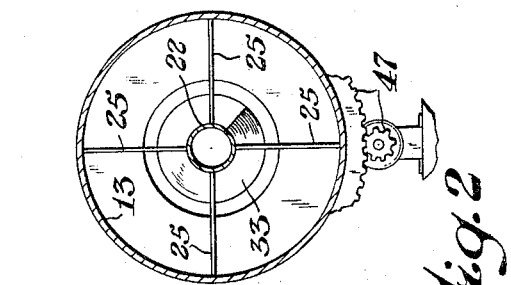
INVENTORS.
Norman Swanson
Joe B. Lovett
BY
Griswold & Burdick
ATTORNEYS United States Patent Office 3,295,930
Patented Jan. 3, 1967

3,295,930
APPARATUS AND METHOD FOR TREATING
PARTICULATE MATERIAL
Norman Swanson, Freeport, and Joe B. Lovett, Sweeny, Tex., assignors to The Dow Chemical Company, Midland, Mich., a corporation of Delaware
Filed July 5, 1963, Ser. No. 292,930
1 Claim. (Cl. 23—286)

This invention relates to the treatment of particulate material with air and moisture as in the production of dense soda ash ($Na_2CO_3$) and particularly relates to an improved apparatus for use in preparing dense soda ash from less dense ash and to a method of preparation thereof.

Much of the commercial so-called dense soda ash, that is soda ash having a bulk density up to perhaps about 65 pounds per cubic foot, is presently produced by hydrating a less dense ash of a bulk density usually not greater than about 35 pounds per cubic foot. This is done by using particular amounts of water, and heating the so-hydrated light ash in, for example, an ordinary rotary kiln. A dense ash results due to the formation of relatively large crystals while the hydrated light ash, being sodium carbonate monohydrate, undergoes drying and heating. In order to obtain large crystals, however, and thus a dense ash product, the amount of water present during crystal formation and drying is fairly critical in that it must be within a range generally of from about 20 to about 35 percent, based on the weight of the light soda ash to be converted. By so-controlling the amount of water, the evaporation thereof, and the temperature of the light ash during processing, a crystal distribution, preferably of a crystal size capable of passing through a number 30 to about a number 100 screen (U.S. Standard Sieve Series, Fine), can be obtained. If on the other hand insufficient water is present in the hydrated ash, for example, because of excessive evaporation, conversion thereof to dense ash is incomplete, causing formation of crystals of an undesirably small size, for example, crystals capable of passing a number 140 screen size. Also, if excess water is employed, twinning, crossing, and agglomeration of small crystals results rather than the formation of the desired large crystals. In general, then an optimum quantity of water during processing for converting the light soda ash is needed for a given quantity of said ash at a given crystal formation temperature.

It is apparent, therefore, that evaporation during processing of the water initially added to the light ash for hydration is of prime importance and must be closely controlled if a soda ash product having a high bulk density is to be obtained.

In attempting to control said evaporation in other than simple laboratory preparations of dense ash, however, such as, for example, a continuous large scale high production operation, evaporation rate control becomes difficult. This is due not only to the relatively large mass of material being processed in such operations but also to the less precise control possible as is inherent in the nature of a large production apparatus. In addition, conventional apparatuses which might be used in making dense ash by the above method, such as rotary kilns or dryers, are not ideally suitable since if so-used the unrestricted volume of air necessarily coming into contact with the substantially converted ash in one end of the kiln in order to dry it to a dense ash product may cause an intolerable rate of evaporation in the hydrated light ash being fed into the kiln at the feed end and thus, as explained above, an incomplete formation of large crystals and consequently a less dense unsatisfactory product.

Accordingly, the object of the present invention is to provide an improved apparatus for the treatment of particulate material with air and moisture as in preparing dense soda ash from light soda ash which is a simple manner effectively controls the volume of air flowing therethrough and contacting the contents thereof, thus controlling the rate of evaporation, thereby making possible the continuous production of a soda ash product of a large crystal size and having a high bulk density.

Another object of the invention is to provide an improved process for preparing high bulk density soda ash.

In general, the apparatus of the present invention comprises an assembly of two chambers rotatable around its longitudinal axis, one of the chambers serving as a mixer and hydrator and the other as a dryer. An exhaust means, as, for example, a tube, is rigidly attached to the inside of the assembly and may extend the full length of the mixer chamber and partially into the dryer chamber. Through said tube, as controlled by certain adjustable dampers, a part of the total volume of air entering into and flowing from the dryer chamber is exhausted. By these means the amount of air (and thus the evaporation rate) passing over an adjacent countercurrent flow of light ash with water, if necessary, or hydrated light ash, being fed into the mixer chamber is controlled. At the same time, the light ash, through rotational motion of the assembly, proceeds towards and into the dryer chamber while being converted into the desired dense soda ash product. In addition, the apparatus comprises an air inlet and outlet means for both said chambers, including means for exhausting air from the first chamber, an inlet means for charging light ash into the first chamber (through which water also may be introduced, if necessary), driving means to rotate the assembly about the longitudinal axis, heating means to heat the air in the second chamber (dryer), and support means (not shown) for positioning the apparatus preferably at an inclination to the horizontal so that on rotating the assembly the particulate material fed into the first chamber will tumble and roll from the particulate feed inlet through the first and second chambers to the product discharge openings of the second chamber as finished product.

The invention and above objects, including additional objects and advantages will be more fully understood when the following detailed description is read in conjunction with the accompanying drawing in which:

FIG. 1 is a side elevational view largely in section with some parts cut away to show internal structure of an embodiment of the apparatus in accordance with the present invention.

FIG. 2 is a sectional view of the apparatus of FIG. 1 taken along line 2—2.

FIG. 3 is a sectional view of the inlet end of the air flow diversion tube of the apparatus of FIG. 1 showing a shroud over said end.

FIG. 4 is a sectional view of the apparatus of FIG. 1 taken along line 4—4.

Referring in detail to the drawing, FIG. 1 shows an assembly of two chambers in end to end relation supported for rotation about the longitudinal axis in a position slightly inclined to the horizontal. The assembly has a discharge end indicated generally by number 11 and a charging end indicated by numeral 12. The wall 13 of the assembly 10 near its mid-section approximately at an equal distance from the ends thereof is restricted to a smaller diameter, more fully defined herein, such that the assembly 10 is essentially separated into a first chamber designated a mixer portion indicated generally by numeral 14, and a second chamber designated a dryer portion, indicated by numeral 15, the dryer portion being equipped primarily on the inside thereof with a heating means rigidly attached to the side wall 13 comprising a steam inlet pipe 16, a steam header ring 17, and a condensate ring 18, both said rings being connected by sets of steam lines or pipes 19, which also will be more fully described below. A plurality of steam traps 20 are attached to said condensate ring 18 outside the cylinder to provide a means for releasing condensate which continually collects therein. Within the assembly 10 is an hollow air flow diversion tube 22, hereinafter referred to simply as a tube, for exhausting a desired part of the air flow from the dryer chamber 15 through said tube rather than into and through the mixer chamber 14, as will be more fully described along, with reasons therefor, below. By so-directing the air flow along with regulating the temperature in the apparatus the rate of evaporation of the water in the hydrated light soda ash as it is being processed can be effectively controlled, thus a dense ash product produced.

The air tube 22, having an inlet end 24 and an outlet end 23, is coaxially disposed within the assembly 10 extending the full length of the mixer chamber 14 thereof and continuing into the dryer chamber 15 a distance equal to approximately one-fourth the length of said dryer chamber. The tube is rigidly attached to the internal wall 13 by a plurality of annular support members 25 such that both the tube and the two chambers will rotate together on a common longitudinal axis when the apparatus is in operation.

The inlet end 24 of the tube, located in the dryer chamber, is equipped with air inlet means, such as, for example, multiple openings 26 cut into the tube wall, and is enclosed at its top and sides with a hood or shroud 27 to prevent product from entering and clogging the air inlet openings 26 as said product is caused to roll and tumble whereby some rains on said shroud by the rotational movement of the apparatus while air enters the openings 26. Being equally weighted on each side and resting on bearing surfaces 28, the shroud maintains a fixed position with respect to the assembly when the apparatus is operated, that is, it does not rotate with the air tube but rather maintains its shrouding position over the inlet end 24 of the air tube while it rotates.

The air outlet end 23 of the tube which partially extends outside the mixer chamber into and through a stationary housing or cover 30, as shown in FIG. 1. The housing 30 is adjacent to the charging end 12 of the assembly 10 and contains an inlet means 31 for charging material into the mixer. The housing also has an outlet means 32 to withdraw air from the mixer chamber. On that part of tube 23 within said housing 30 is an auger or helical screw feeder 33 which rotates with said tube to feed light ash into the mixer 14. The auger is rigidly attached to said tube such as, for example, by welding, brazing or by other conventional means. Such an auger may alternatively be rigidly attached to, thus rotate with, the mixer chamber. In addition, attached to the portion of the tube 22 projecting through and outside the housing 30 and the first chamber 14 is a means, such as, for example, a fan 34 for exhausting air therefrom. An adjustable damper 35 in tube 22 located near said fan 34 is provided to control the rate of flow of air so exhausted.

The aforesaid housing 30, being stationary with respect to the chambers, is slidably connected to the charging end 12 of the first chamber by, for example, a conventional rotary seal represented by numeral 36 and is positioned by suitable support means 37. The air outlet means 32 of the housing, such as, for example, a pipe leading therefrom, is also equipped, for example, with a fan 38 and damper 39 to provide, in conjunction with the air tube 22, means for controlled exhaustion of the air from both the mixer 14 and air tube 22.

An opening 42 is provided in the end wall 41 at the discharge end of the second chamber 11 for admitting air to the assembly through the dryer portion. If desired, this inlet can also be provided with an adjustable damper, not shown, to conveniently restrict the flow of air therethrough. Instead of the exhaust fans 34 and 38, a single fan or blower 50 may be provided to drive the required air into the apparatus through opening 42, as indicated in dotted outline. Through the end wall also extends the aforesaid steam inlet pipe 16 which is connected to the aforementioned steam header ring 17. Steam from said inlet 16 enters the header 17 and from there is distributed to the steam lines 19 and whence it enters the condensate ring 18, with any condensate being bled off therefrom through one or more of the steam traps coupled to the condensate ring 20. As near the discharge end 11 of the second chamber as conveniently possible, is a plurality of discharge openings 43 through which the dense ash product is discharged as the assembly rotates about its longitudinal axis. A stationary horseshoe-shaped covering 44 extends nearly all around the discharge end, covering all said openings except the one reaching the bottom 45 as the assembly rotates. The covering as aforesaid does not rotate and must therefore be slidably connected and sealed, as by rings 48, to the wall 13 of the dryer portion 15 over said openings. Immediately below the lowermost outlet at the bottom of the second chamber and independent therefrom is a conveyor 46 whose vertical axis corresponds substantially to that of the aforesaid discharge openings 43 for receiving and carrying away the dense soda ash product discharged through said openings.

Any conventional heating means may be used in or in conjunction with the dryer portion to obtain the desired temperature as will be described below. As aforesaid, the heating means depicted in FIG. 1 comprises a steam inlet pipe 16, steam header 17, and steam condensate ring 18, the rings being connected by a number of sets of parallel steam lines 19, e.g. three sets, each set being about equally spaced circumferentially on and coupled to the rings with each line or pipe 19 in each set being on a perpendicular axis passing through the horizontal or longitudinal axis of the assembly 10. The steam traps 20 attached to the condensate ring outside the chamber wall 13 may be, for example, commercially available thermally actuated bellows-type devices which bleed off the condensate from said ring.

Inasmuch as the size of the apparatus of the present invention can vary, the exhaust air tube 22 should be of a diameter such that in relation to the diameter of the chambers it will be capable of diverting from about 10 to about 90 percent by volume of the total volume of air entering the dryer chamber, via inlet 42, per unit of time. Preferably about 30 to 50 percent of the volume of the input air will be removed or diverted by the air exhaust tube, the balance being exhausted through the mixing chamber via outlet 32. Correspondingly, the aforesaid restriction in the diameter at the mid-point of the assembly, i.e. between adjoined chambers, though not critically necessary to the invention, should be sufficient to at least allow passage of the shrouded air tube and also allow a product flow therethrough from the first to the second chamber while yet distinctly separating the two chambers by the hollow frustro-conical section 49, for example.

Normally the apparatus of the present invention will be supported by encircling rings, for example, resting on rollers (not shown) at each end thereof as with conventional kiln dryers on a slight incline sufficient to facilitate product flow from the charging end 12 to the discharge end 11 as the assembly rotates on its longitudinal axis. If desired, however, the inside wall of the chambers may be provided with perpendicular paddle-like projections (not shown) so angled as to urge the particulate material to flow from the input end to the output end during processing in the apparatus.

Conventional rotary or other type seals may be used throughout the apparatus where necessary to separate the rotating parts of the apparatus from the non-rotating parts as are differentiated and pointed out above.

Rotational power may be provided by conventional means, such as for example, a gear drive arrangement 47 as is shown in FIG. 1, or by, for example, one or more powered idler wheel supports (not shown).

In operating the apparatus of the present invention, as for example in accordance with the embodiment shown in FIG. 1, to convert light soda ash into dense soda ash, the light soda ash to be converted along with from about 20 to about 35 percent water, preferably from 27 to 33 percent, based on the weight of the light ash, is fed through the charging inlet 31 onto the ribbon feeder 33. As the assembly 10 of the chambers is revolved and also revolves tube 22 and the ribbon feeder 33, the feed materials are thereby conveyed into the mixer chamber 14 of the apparatus which is rotating. The so-charged light ash and water are thoroughly mixed and hydrated while being subjected to a heated countercurrent of air through the chamber, said air being at a temperature in the mixer chamber of from about 90° to about 105° C. and preferably at about 100° C. By a rolling and tumbling flow the hydrated soda ash material traverses the mixer chamber 14 and enters the dryer chamber 15 wherein the material is constantly being stirred or shuffled and tumbled by the riffling action of the outside of the steam lines 19. In the dryer, then, conversion to dense ash is completed and the dense ash dried to a nonhydrated product. The temperature of the countercurrent of air in the dryer, although it may be higher nearer the end closest to the mixer chamber 14, is generally from about 60° to about 90° C. and preferably at about 80° C. Having traversed the dryer chamber 15 of the apparatus, the now dry dense ash exits through the discharge openings 43 in the walls 13 at the discharge end 11 of the dryer chamber 15 and falls onto, for example, a conveyor 46 which carries the dense product either to a storage facility or to a utilization device.

The aforesaid current of air in proceeding from the dryer chamber 15 into the mixer chamber 14 is produced by the exhaust fans 34 and 38 which draw air into both chambers through the adjustable air inlet 42 provided in the end walls 41 of the dryer chamber 15 of the apparatus. As aforesaid, however, such current of air may be produced by one or a combination of other means. The air as it enters the dryer chamber is initially heated to the aforesaid temperature (60° to 90° C.) by a heating means adjacent or connected to the dryer chamber, such as, for example, the steam rings 17 and 18 and lines 19 as shown in FIG. 1. The part of the total volume of air entering the dryer chamber which is not diverted through the air exhaust tube 22 then proceeds into the mixer chamber at a temperature of from about 90° to about 105° C., having been finally heated to that temperature in the dryer chamber and contacts the hydrated light ash, thereby to heat it and at least partially convert it to dense ash in the mixer chamber, whereupon, after traversing both chambers is drawn out through the air outlet 32.

The part of the total volume of air entering the dryer chamber which is diverted through the air tube 22, however, thus not contacting the hydrated light ash in the mixer chamber 14, is drawn into said tube by the fan 34 located in the outlet end 23 thereof where it also exits. By so-diverting or exhausting a portion of said total volume of air through the air exhaust tube, thus limiting the volume contacting the hydrated light ash in the mixer, the evaporation rate of the water in said light ash as it is being processed is effectively controlled thereby, as explained previously, making possible the continuous production of a soda ash product having a high bulk density.

To facilitate hydration of the light soda ash feed, that is, the formation of sodium carbonate monohydrate by the addition and admixture therewith of water in the mixing chamber, it has been found desirable to incorporate into the water so-added from about 50 to about 450 parts per million (p.p.m.) of either polyalkylenepolyamine or polyethyleneimine. By so-doing hydration of the light ash feed is more rapid and more complete.

For convenience, the aforedescribed adjustable dampers 35 and 39 may be actuated by connecting each one to a conventional temperature sensitive device (not shown) such as, for example, a Foxboro model 56 thermocouple, whereupon the dampers will be opened or closed depending on the temperature of the air within the chambers.

In addition, by controlling the opening and closing of the dampers, humidity in the apparatus may also be controlled.

It should be understood that the present invention is not intended to be restricted to the specific embodiments thereof as described above and as shown in the accompanying drawing, it being manifest that the apparatus and method of the present invention as described above and shown can be changed and modified without departing from the substance and scope of the invention.

We claim:

An apparatus for treating a particulated solid with an air stream and moisture comprising: an assembly of a first and second elongated hollow chamber in end to end communication with their longitudinal axes in alignment, motor means for revolving the assembly about the longitudinal axis thereof, feeder means for the first chamber for the admission of particulate solid thereto, an exhaust means connected to the first chamber for the exhaustion of air therefrom, variable heater means for the second chamber disposed adjacent to the side wall thereof, an exhaust pipe having an inlet extending through the first chamber and into the second chamber for exhausting air from said second chamber, the inlet end of said exhaust pipe being adapted with a shroud to prevent clogging quantities of particulate material from entering said exhaust pipe while exhausting air therefrom, an air inlet for the second chamber near the end wall remote from the first chamber, the side wall of the second chamber adjacent to the end remote from the first chamber having therein product discharge openings around the chamber.

References Cited by the Examiner

UNITED STATES PATENTS

| | | | |
|---|---|---|---|
| 658,727 | 9/1900 | Naef | 23—63 X |
| 678,970 | 7/1901 | Naef | 23—284 |
| 1,938,832 | 12/1933 | Hougen et al. | |
| 3,061,409 | 10/1962 | Robson et al. | 23—63 |
| 3,087,798 | 4/1963 | Korwin et al. | 23—284 |
| 3,104,942 | 9/1963 | Handwerk et al. | 23—63 |

MORRIS O. WOLK, *Primary Examiner.*

BENJAMIN HENKIN, JAMES H. TAYMAN, JR.,
*Examiners.*

G. OZAKI, *Assistant Examiner.*